(12) United States Patent
Helms et al.

(10) Patent No.: US 10,926,933 B2
(45) Date of Patent: Feb. 23, 2021

(54) PACKAGING MATERIAL FOR PREVENTION OF RUST AND METHOD OF MANUFACTURING THE SAME

(71) Applicants: George S Helms, Canton, MI (US); Kevin Heires, Midland, MI (US)

(72) Inventors: George S Helms, Canton, MI (US); Kevin Heires, Midland, MI (US)

(*) Notice: Subject to any disclaimer, the term of this patent is extended or adjusted under 35 U.S.C. 154(b) by 0 days.

(21) Appl. No.: 16/504,283

(22) Filed: Jul. 7, 2019

(65) Prior Publication Data

US 2020/0299049 A1    Sep. 24, 2020

Related U.S. Application Data

(63) Continuation of application No. 16/362,566, filed on Mar. 22, 2019, now abandoned.

(51) Int. Cl.
| | | |
|---|---|---|
| B65D 81/02 | (2006.01) | |
| B32B 27/08 | (2006.01) | |
| B32B 27/36 | (2006.01) | |
| B65D 81/24 | (2006.01) | |

(52) U.S. Cl.
CPC ............. *B65D 81/02* (2013.01); *B32B 27/08* (2013.01); *B32B 27/36* (2013.01); *B65D 81/24* (2013.01); *B32B 2250/03* (2013.01); *B32B 2250/244* (2013.01); *B32B 2307/752* (2013.01)

(58) Field of Classification Search
CPC ........ B65D 81/02; B65D 81/24; B32B 27/08; B32B 27/36; B32B 2250/244; B32B 2250/03; B32B 2307/752
See application file for complete search history.

(56) References Cited

U.S. PATENT DOCUMENTS

2012/0205264 A1* 8/2012 Amy .................. B32B 27/18
                                                                        206/205

\* cited by examiner

*Primary Examiner* — Nathan L Van Sell
(74) *Attorney, Agent, or Firm* — Inventa Capital PLC

(57) ABSTRACT

A packaging material (material) of the present invention is used to cover and wrap the metal parts during transportation and storing and in order to prevent rusting and corrosion. The material includes an inner layer and a pair of outer layers sandwiching the inner layer. The inner layer is formed from extruded rigid PET material wherein the outer layers are fabricated from VCI (vapor corrosion inhibitor) embedded into extruded sheets of rigid PET. The material is used for packaging for all ferrous metals for anti-rust. Thermoforming embed corrosion inhibitors directly into rigid plastic material of the outer layers it improves quality by ensuring corrosion inhibitors are incorporated into all packaging while providing superior part protection.

3 Claims, 6 Drawing Sheets

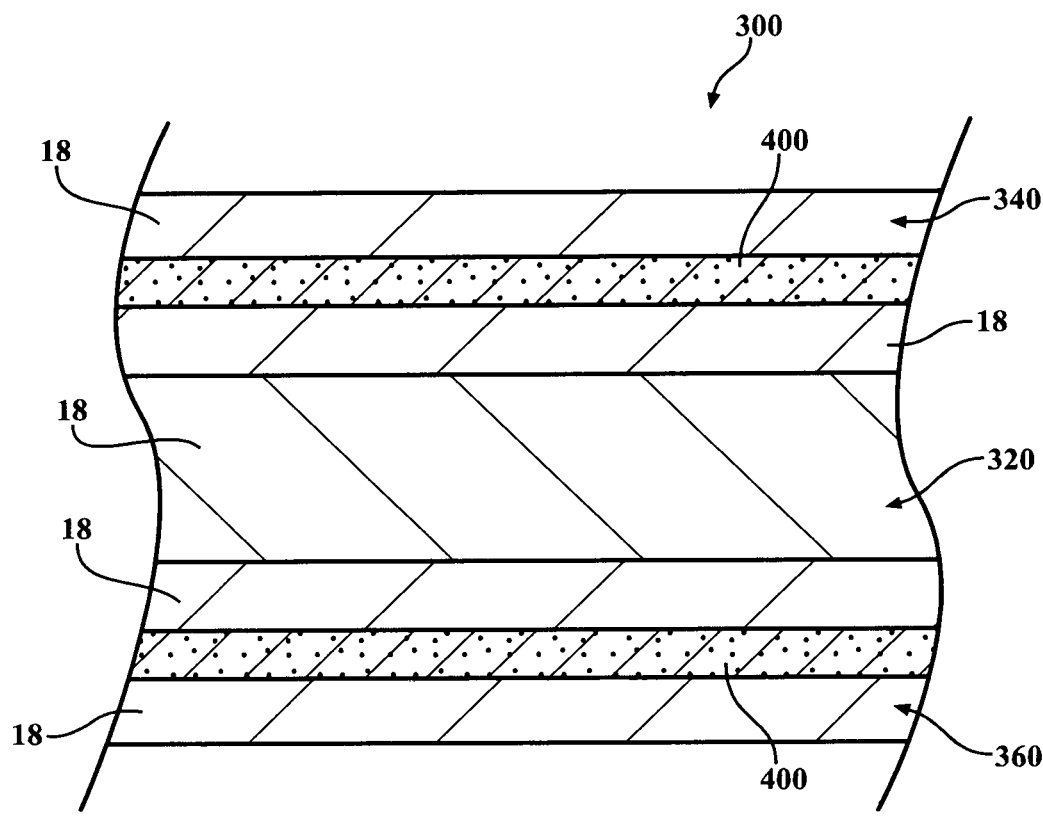
FIG. 3
FIG. 5
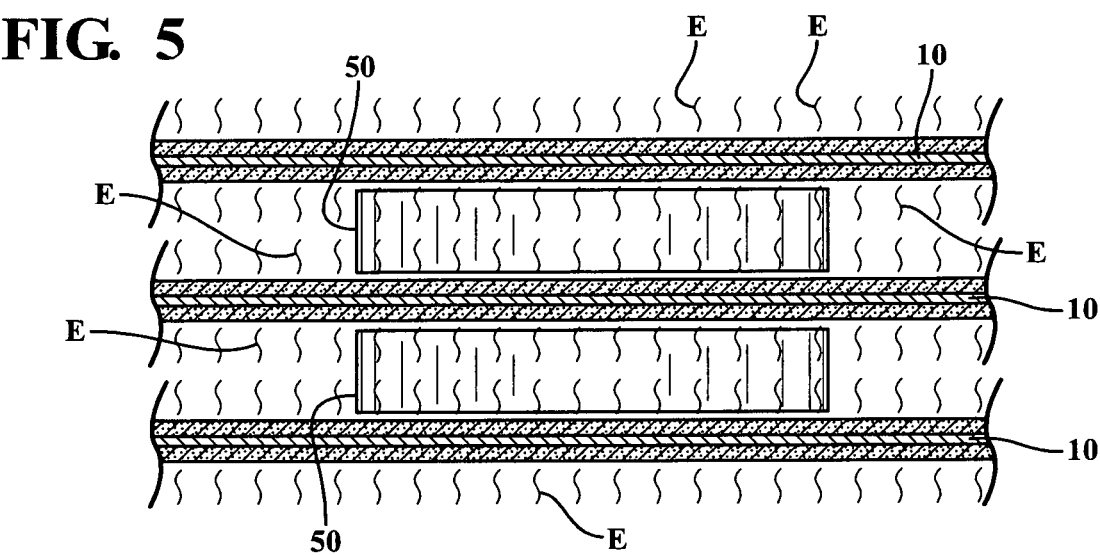

PACKAGING MATERIAL FOR PREVENTION OF RUST AND METHOD OF MANUFACTURING THE SAME

FIELD OF INVENTION

This invention relates to packaging materials for metallic part(s) to prevent rusting, more particularly, to novel corrosion inhibitors, method and techniques of utilization thereof.

BACKGROUND OF THE INVENTION

Packaging materials of all kinds have been used for years in order to package metals parts of all kinds when transporting the same between different locations or simply storing the parts. The packaging materials are used in numerous industries including and not limited to automotive industry, aerospace industry, and many others as almost every industry uses parts and components manufactured from metals of all kinds.

Many packaging materials are fabricated from pulp and plastics. The molecules coat metal surfaces with a molecule thick layer. Corrosion occurs when an electrolyte is near the surface of the metal, the electrons flow from higher energy to lower energy areas of the metal and loop the transfer of electrons through the electrolyte. This process causes the formation of oxidation build up on the surface of the metal, and thus causes "rust". It is important to keep a molecule thick layer around the metal in order to stop the current flow of electrons.

In the past, various corrosion inhibitor products have been widely used in a number of applications, ranging from engine use to product packaging. One common form of corrosion inhibitor products is the use of vapor-phase inhibitor emitting compounds in product packaging, including compounds being incorporated into thin (0.0015-0.0120") plastic flexible packaging film, and containers or vapor-phase corrosion inhibitor material that are placed into a shipping or packaging container for a product that may otherwise be susceptible to corrosion of the metal parts. Plastic film with corrosion inhibitor compound is made by incorporating such compounds into low density polyethylene resin, which is extruded into plastic sheet stock that is used as a sheet insert, bag or as envelopes of plastic packaging for the metal being protected from corrosion.

Other similar products and methods include the use of a coating on a portion of the packaging material, use of tablets or packets of the corrosion inhibitor compound, use of an absorbent paid treated with corrosion inhibitor compounds and taped to the inside of a shipping container, use of cups containing the compound with a vapor permeable top cover, and use of vapor-permeable envelopes containing powdered solid of the corrosion inhibitor compound.

Alluding to above, U.S. Pat. No. 5,426,916 to Grigsby, for example, teaches a liquid-impregnated flexible sheet includes high capillarity pores for retaining the impregnated fluid. The fluid may be an oil having a boiling point and vapor pressure sufficient to promote vaporization of the oil at room temperature, the vaporizable oil can function as a corrosion inhibitor making the sheet useful for wrapping metallic articles. A surfactant may also be added to the sheet to enhance corrosion inhibition. The sheet comprises a homogenous mixture of a polyolefin-based component and n inert filter. The sheet may be used alone or as one component of a composite that includes material that have other desirable properties. The composite may be assembled into a container, such as a gun case. A vapor-phase corrosion inhibitor is a material, preferably solid at room temperature, the gaseous form of which will inhibit corrosion, particularly oxidative corrosion, of metals, especially these metals normally corroded or oxidized by the presence of water vapor in air. The problems involved in atmospheric, corrosion of metals, especially ferruginous metals, by atmospheres containing water vapor and oxygen, e.g., moist or humid air, are well known to manufacturers, handlers, and users of such metals. Prior to the discovery of vapor-phase corrosion inhibitors, the only methods for combating such corrosion were either to separate the metals from the corrosive atmosphere with a coating, such as a paint, oil, or grease, or to extract one or more of the corrosive elements from the atmosphere, such as by the use of a dehydrating agent to dry the air. These methods are, in general, either too time-consuming or too ineffective to be completely satisfactory.

Other concerns of the manufactures utilizing current VCI materials is that employees packaging metallic materials may not properly use or omit entirely the VCI materials in the packaging as it is an auxiliary requirement that must be added. Other concerns may include the shearing and or tearing of such materials that may potentially cause debris contamination of metallic components or lead to the ineffective protection corrosion inhabitation if VCI is able to vent out of packaging. However, under proper circumstances, as described more fully below, the use of vapor-phase corrosion inhibitors embedded directly into the rigid formed packaging provides a simple and very satisfactory solution to) the problems of corrosion.

It is, therefore, an object of this invention to provide novel and effective vapor-phase corrosion inhibitors and compositions directly into the rigid formed packaging that safely secures and protects metal components and or assemblies.

It is another object of the present invention to provide new methods utilizing, and combinations including, such inhibitors and compositions.

There is a longstanding need and opportunity for improved designs and methods for fabricating new packaging material adaptable to create a molecule thick layer around the metal parts, thereby stopping the current flow of electrons in order to prevent rusting of the metal parts.

SUMMARY OF THE INVENTION

A packaging material of the present invention include at least three layers, such as an inner or middle layer, and a pair of outer layers. Each of the layers are extruded or laminated from impregnated base plastic plastics. Other materials such as HIPS, PE, HDPE, PP may be used without limiting the scope of the present invention. The other layers include particles of vapor corrosion inhibitor (VCI). In one embodiment of the present invention, the particles of VCI are mixed with particles of the impregnated base plastic (PET) before the layers are extruded before, the material is formed. In alternative embodiment of the present invention, there are at least three layers, such as an inner or middle layer, and a pair of outer layers. Each of the layers is formed from impregnated base plastic. (PET).

Other materials such as HIPS, PE, HDPE, PP may be used without limiting the scope of the present invention, the outer layers include layers of vapor corrosion inhibitor (VCI). Each layer presents a plastic film or paper sheet. Still another alternative embodiment includes at least three layers, such as an inner or middle layer, and a pair of outer layers. Each of the layers are formed from impregnated base plastic (PET). Other materials such as HIPS, PE, HDPE, PP may be used without limiting the scope of the present invention. Each outer layer includes layer vapor corrosion inhibitor (VCI).

The layers of vapor corrosion inhibitor (VCI) are formed inside each outer layer. The thickness for the layers as structured is as follows: the outer layers include at least 2 of VCI by weight and the inner layer includes at least 100% of PET. As the material surrounds metal parts, the particles of the VCI semi-evaporate from the material and add a semi charged layer over, the metal components by 1 to 2 molecules thick to create an evenly distributed coating that protects against moisture and or the reaction of ferrous materials to liquids, i.e. water and or water vapor.

As VCI is thermoformed to embed corrosion inhibitors directly into rigid plastic material of the outer layers it improves quality by ensuring corrosion inhibitors are incorporated into all packaging.

An advantage of the present invention is to provide a unique packaging material wherein VCI is added to thermoformable plastic in a thicker gage of 0.005-0.500" which allows thermoforming of plastic sheet and or film to be thermoformed in rigid forms to provide improved part protection and part cleanliness. An industry example is for automotive markets for precision machined components or low debris contamination components such as engine or transmission components. The removal of any fiber materials such as cardboard or paper sheeting improves part cleanliness.

Another advantage of the present invention is to provide a unique packaging material wherein VCI incorporated to thermoformable plastic in a thicker gage of 0.005-0.500" thick allows for the VCI Thermoplastic to act as both the physically protective package and to inhibit metallic corrosion.

Still another advantage of the present invention is to provide benefit of combining VCI into rigid thermoforming materials resulting in the alleviation of loose VCI paper or film.

Other advantages and meritorious features of this invention will be more fully understood from the following description of the preferred embodiment, the appended claims, and the drawings, at brief description of which follows.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a partial cross sectional view of another alternative embodiment of the packaging material of the present invention;

FIG. 5 is a partial cross sectional view of the metal parts sandwiched the layers that create a molecule thick layer of vapor corrosion inhibitor around the metal pans thereby stopping the current flow of electrons wherein current is disrupted from the acting "anode" to the "cathode" on the metal part and to prevent rusting of the metal parts;

DETAILED DESCRIPTION OF THE INVENTION

Figure 1:
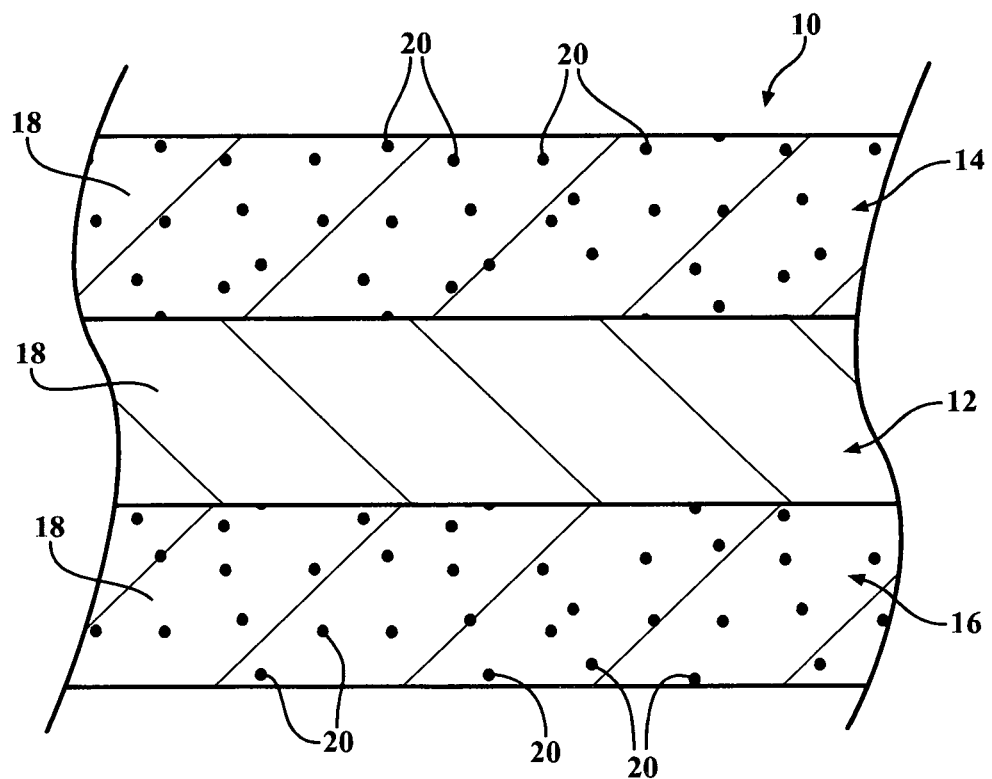
FIG. 1 is a partial cross sectional view of a packaging material of the present invention having at least three layers, such as an inner layer or a middle layer, and a pair of outer layers, wherein each of the layers is formed from impregnated base plastic (PET) and the outer layers include particles of vapor corrosion inhibitor (VCI) fusible connected with particles of the PET.

Referring to FIGS. 1 through 7, wherein numerals indicate like or corresponding parts, an inventive packaging material, generally shown at 10 on FIG. 1, which illustrates a partial cross-sectional view of the packaging material. There are at least three layers, such as an inner or middle layer, generally indicated at 12, and a pair of outer layers, generally indicated at 14 and 16. Each of the layers 12, 14, and 16 are formed from impregnated base plastic (PET) material 18. Other materials such as HIPS, PE, HDPE, PP may be used without limiting the scope of the present invention. The outer layers 14 and 16 include particles of vapor corrosion inhibitor (VCI) material 20. In one embodiment of the present invention, as shown on FIG. 1, the particles of VCI material 20 are mixed with particles of the impregnated base plastic (PET) material 18 before the layers 14 and 16 are extruded and prior to forming the material 10.

Figure 1A:
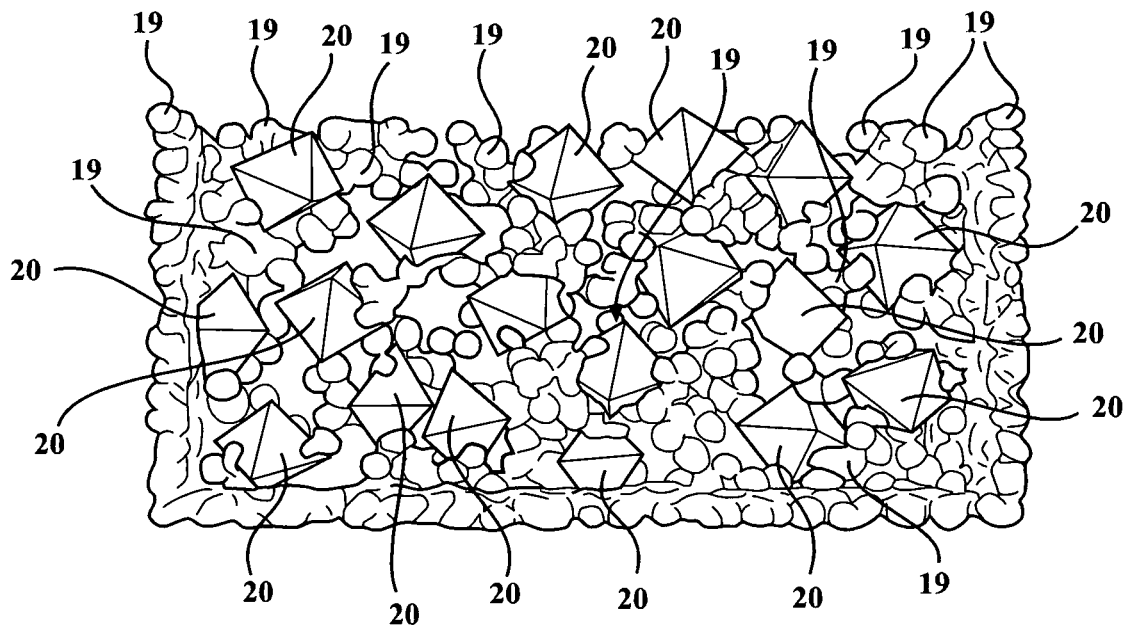
FIG. 1A is a partial enlarged and cross sectional view of the outer layer showing the particles of the VCI fusible connected with the particles of the PET.

As shown on FIG. 1A, each outer layer 14, 16 presents an active core formed inside the outer layers 14, 16. The active core includes the particles of VCI material 20 being integral with and extending from particles 19 of the impregnated base plastic (PET) material 18. The particles of VCI material 20 and the particles 19 of PET material 18 are fusible-connected with one another thereby forming a porous structure of the active core inside each outer layer 14, 16.

Figure 2:
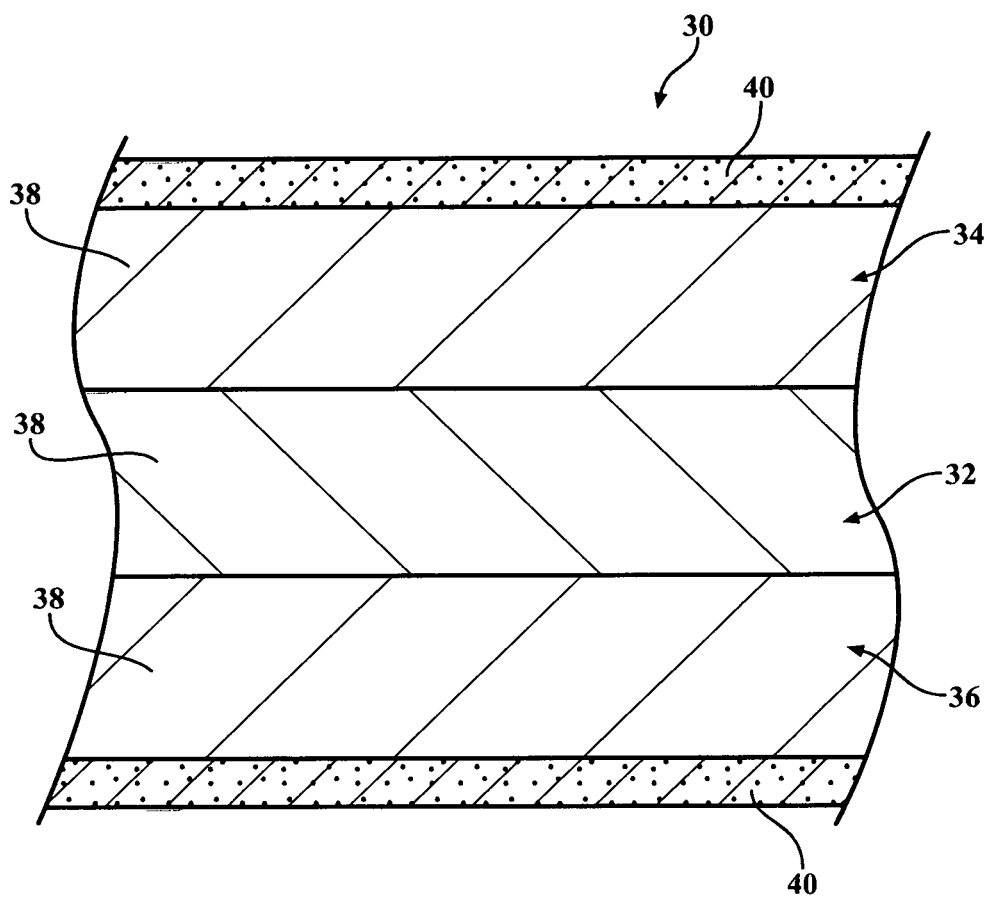
FIG. 2 is a partial cross sectional view of an alternative embodiment of the packaging material of the present invention.
Figure 4:
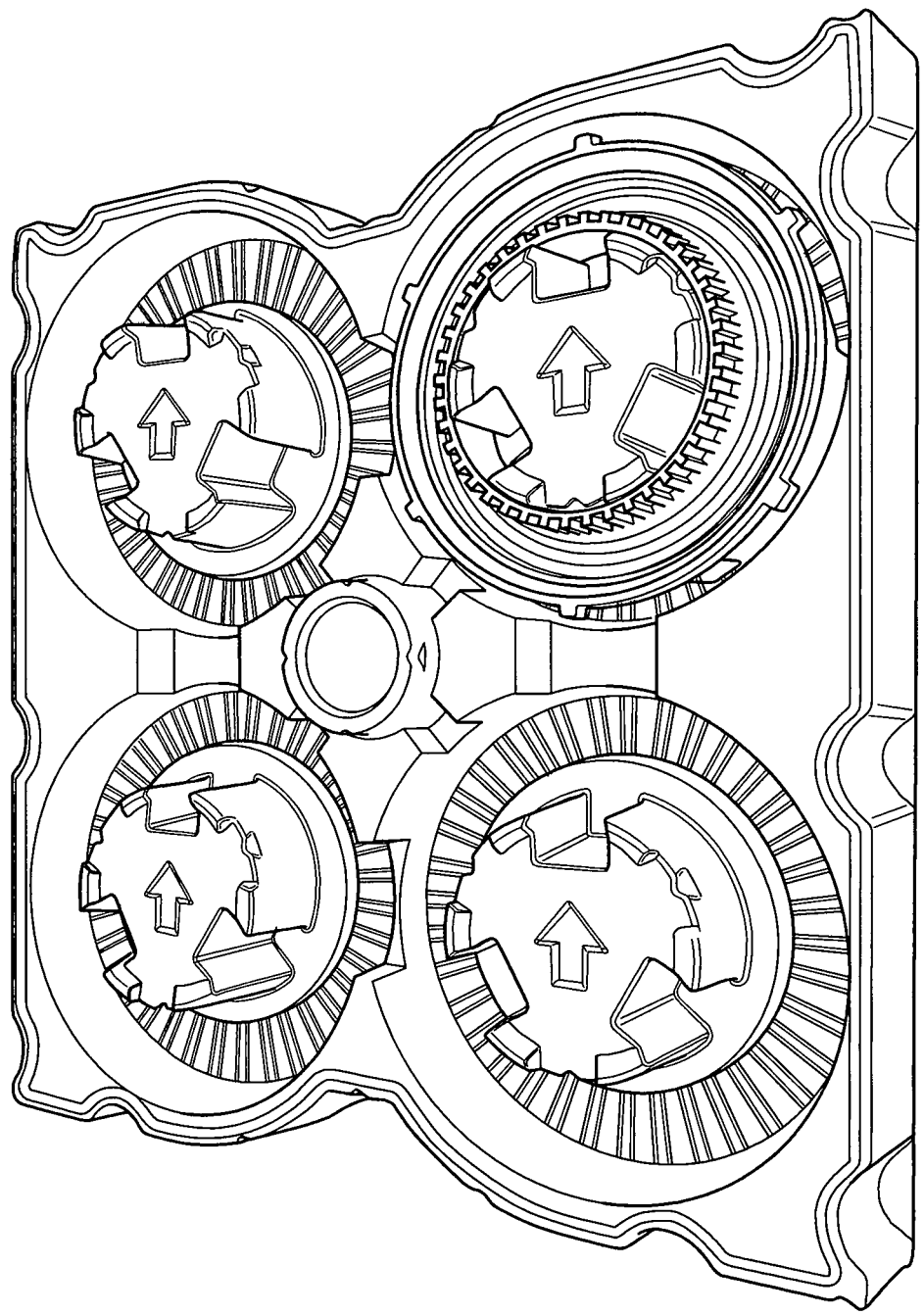
FIG. 4 is a perspective view of a layer of packaging material covering metal pan, i.e. bearings nested therein.

In alternative embodiment of the present invention, as generally shown at 30 on FIG. 2, there are at least three layers, such as an inner or middle layer, generally indicated at 32, and a pair of outer layers, generally indicated at 34 and 36. Each of the layers 32, 34, and 36 are formed from impregnated base plastic (PET) material 18. Other materials such as HIPS, PE, HDPE, PP may be used without limiting the scope of the present invention. The outer layers 34 and 36 include exterior layers 40, which have been formed as particles of vapor corrosion inhibitor (VCI) material 20 pre-mixed with particles 19 of the impregnated base plastic (PET) material 18, as described above. As shown in FIG. 2, the exterior layers 40 extend along the outer edges of the respective layers 34, 36. Each exterior layer 40 presents a plastic film or paper sheet as shown on FIG. 2 that may be coextruded or laminated directly on the material.

Alluding to the above, still another alternative embodiment is generally shown at 300 on FIG. 3. There are at least three layers, such as an inner or middle layer, generally indicated at 320, and a pair of outer layers, generally indicated at 340 and 360. Each of the layers 320, 340, and 360 are formed from the impregnated base plastic (PET) material 18. Other materials such as HIPS, PE, HDPE, PP may be used without limiting the scope of the present invention. Each outer layer 340 and 360 includes an internal layer 400, which has been formed by pre-mixing particles of VCI material 20 with particles 19 of PET material 18, as described above. The internal layers 400 are formed inside each outer layer 340 and 360.

Figure 6:
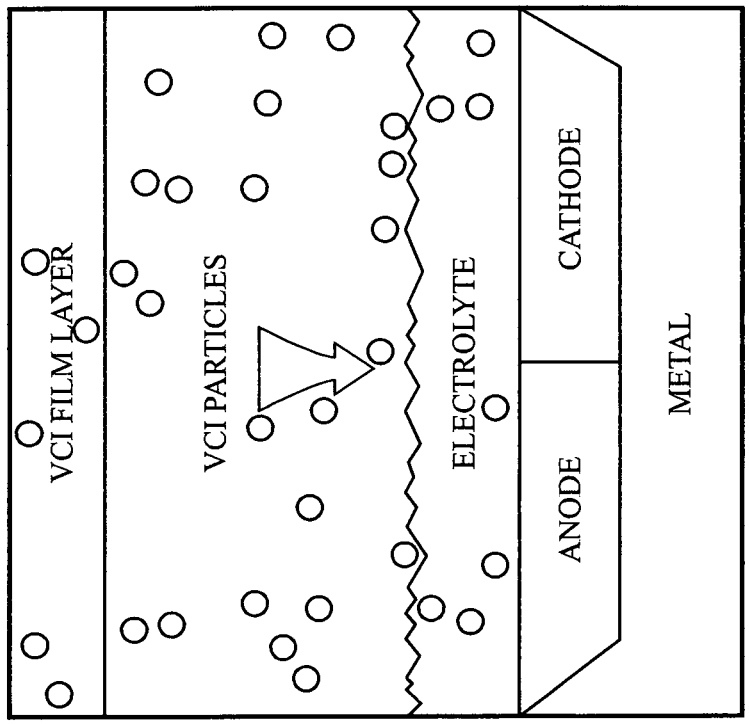
FIG. 6 is a comparison chart that illustrates chemical reactions of metal parts in the prior at packaging environment. (as indicated at A) and chemical reaction of the metal parts sandwiched between the layers of material of present invention (as indicated at B) wherein a molecule thick layer of vapor corrosion inhibitor is created around the metal parts thereby stopping the current flow of electrons wherein current is disrupted from the acting "anode" to the "cathode" on the metal part and to prevent rusting of the metal parts.
Figure 6:
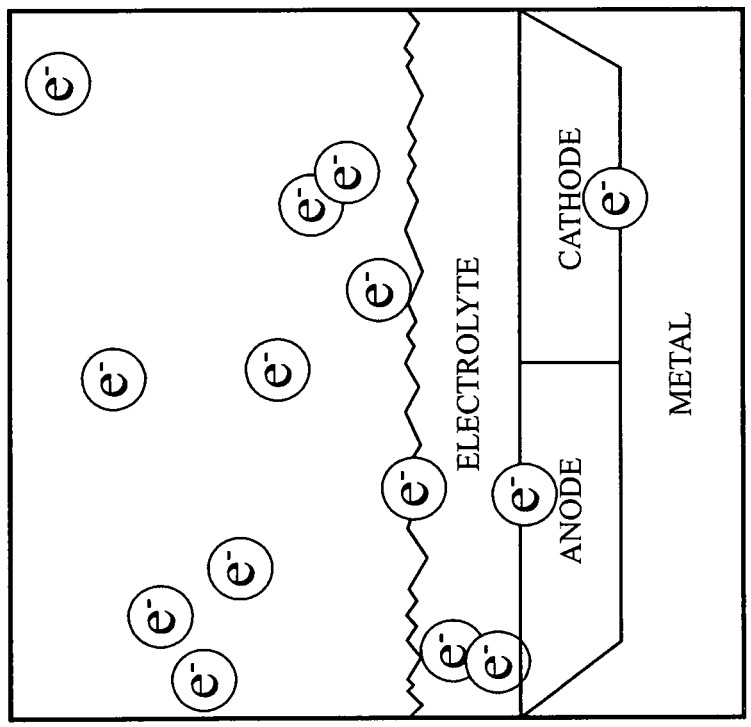

Referring back to FIG. 1, the thickness values for the layers as shown in FIG. 1 are as follows: the layer 14 and 16 include at least 2% of VCI by weight and the inner layer 12 includes at least 100% of PET 18. Referring to FIG. 5, as the material 10 surrounds metal parts 50, the particles 20 of the VCI semi-evaporate from the material and add a semi-charged layer over, as shown at E in FIG. 5, the metal components 50 by about 1 to 2 molecules thick to create an evenly distributed coating, that protects against moisture and or the reaction of ferrous materials to water (H2O). FIG. 6 shows a comparison chart that illustrates chemical reactions of metal parts in the prior art packaging environment, indicated at A, and chemical reaction of the metal parts sandwiched between the layers of material of present invention, indicated at B, wherein a molecule thick layer of vapor corrosion inhibitor is created around the metal parts to stop the current flow of electrons in that the current is disrupted from the acting "anode" to the "cathode" on the metal part, thereby preventing rusting of the metal parts.

Figure 7:
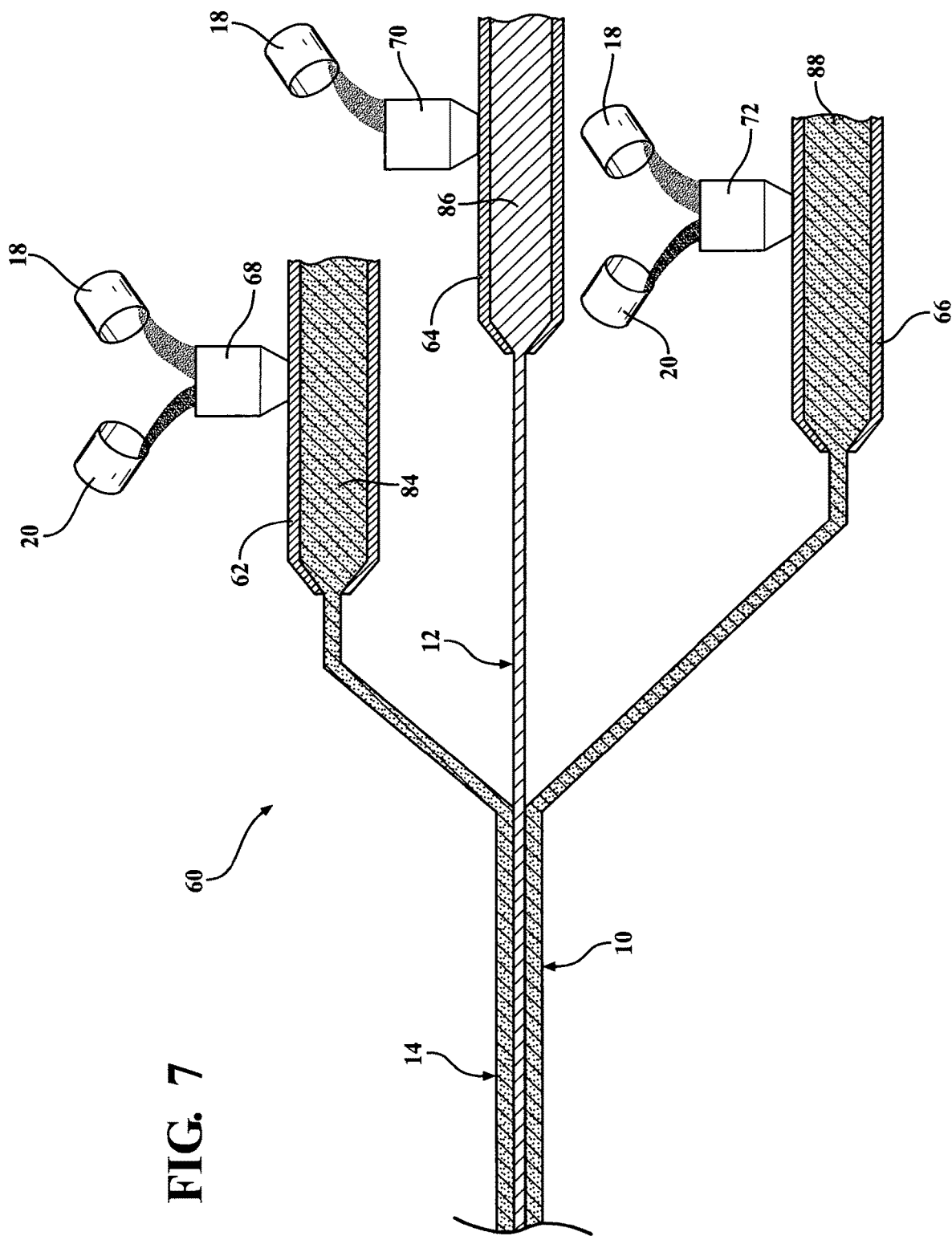
FIG. 7 illustrates a manufacturing process implemented to form the material of the present invention.

Referring now to FIG. 7, a manufacturing process implemented to form the material of the present invention is generally shown at 60. There are three extruder heads 62, 64, and 66 used to extrude respective outer layer 14, the inner layer 12, and the other outer layer 16. The extruder 62 includes a hoper 68 for receiving the PET material 18 and the particles of VCI material 20 mixed with one another in the hoper 68 to extrude the outer layer 14. The extruder 64 includes a second hoper 70 for receiving PET material 18 to extrude the inner layer 12. The extruder 66 includes a third hoper 72 for receiving the PET material 18 and the particles of VCI material 20 mixed with one another in the hoper 72 to extrude the outer layer 16.

Essentially the material "gases" out of the impregnated base plastic (PET. The molecules coat metal surfaces with a 1 to 2 molecule thick layer. When an electrolyte is near the surface of a metal, the electrons flow from higher energy to lower energy areas of the metal and loops the transfer of electrons through the electrolyte. This process causes the formation of oxidation build up on the surface of the metal, and thus causes "rust". Because the VCI has created a molecule thick layer of VCI around the metal, this stops the current flow of electrons. Current is disrupted from the acting "anode" to the "cathode". An Ox (anode for oxidation). To release the VCI from the thermoform material, the VCI must have a high enough Vapor Pressure to permeate out of the material. This material is both Vapor Phase and Contact Phase to provide protection. The thermoplastic resin is mixed with organic monoamine and an acid which reacts and vents the VCI chemistry.

While the invention has been described with reference to an exemplary embodiment. It will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A packaging material for prevention of rust and corrosion of metal parts, the packaging material comprising:
   a body having an inner layer and a pair of outer layers, the inner layer being sandwiched between the pair of outer layers, wherein
   the inner layer is formed by extruding a thermoformable polyethylene terephthalate (PET) plastic, wherein
   the pair of outer layers are formed by mixing particles of the PET plastic with particles of vapor corrosion inhibitor (VCI) to extrude a porous VCI infused structure of an active core inside each layer of the pair of outer layers, and wherein
   each layer of the pair of outer layers is formed in a thickness gauge of 0.005-0.5 inches and contains at least 2% of the VCI by weight.

2. The packaging material as claimed in claim 1, wherein each layer of the pair of outer layers comprises an internal layer formed by mixing the particles of the PET plastic with the particles of VCI, and wherein each internal layer is sandwiched within each respective outer layer.

3. The packaging material as claimed in claim 1, wherein each layer of the pair of outer layers comprises an external layer formed by mixing the particles of the PET plastic with the particles of VCI, and wherein each external layer extends along an outer edge of each respective outer layer.

* * * * *